(12) United States Patent
Nichols (10) Patent No.: US 8,977,228 B2
(45) Date of Patent: Mar. 10, 2015

(54) SYSTEM AND APPARATUS FOR ALERTING USER OF THEFT OR LOSS, OR WHEREABOUTS, OF OBJECTS, PEOPLE OR PETS

(76) Inventor: Andrew Nichols, Santa Fe, NM (US)

(*) Notice: Subject to any disclaimer, the term of this patent is extended or adjusted under 35 U.S.C. 154(b) by 397 days.

(21) Appl. No.: 13/410,829

(22) Filed: Mar. 2, 2012

(65) Prior Publication Data
US 2012/0225633 A1 Sep. 6, 2012

Related U.S. Application Data

(60) Provisional application No. 61/448,469, filed on Mar. 2, 2011, provisional application No. 61/479,580, filed on Apr. 27, 2011.

(51) Int. Cl.
H04M 11/04 (2006.01)
G08B 13/14 (2006.01)
G08B 21/02 (2006.01)

(52) U.S. Cl.
CPC ........... *G08B 13/1427* (2013.01); *H04M 11/04* (2013.01); *G08B 21/0225* (2013.01); *G08B 21/0227* (2013.01); *G08B 21/0277* (2013.01)
USPC .................................. 455/404.2; 455/456.5

(58) Field of Classification Search
CPC ........... G08B 13/1427; G08B 21/0227; G08B 21/0277; G08B 21/0225; H04M 11/04
USPC .............. 455/404.1, 404.2, 410–412.2, 414.1
See application file for complete search history.

(56) References Cited

U.S. PATENT DOCUMENTS

| 5,578,989 | A | * | 11/1996 | Pedtke ...................... 340/539.11 |
|---|---|---|---|---|
| 6,091,323 | A | * | 7/2000 | Kawai ............................ 340/435 |
| 2006/0176167 | A1 | * | 8/2006 | Dohrmann ..................... 340/506 |
| 2006/0227047 | A1 | * | 10/2006 | Rosenberg ............... 342/357.13 |
| 2007/0205895 | A1 | * | 9/2007 | Bergener ................... 340/572.1 |
| 2008/0278309 | A1 | * | 11/2008 | Troxler ....................... 340/539.1 |
| 2009/0275320 | A1 | * | 11/2009 | Marshall ....................... 455/418 |
| 2010/0003958 | A1 | * | 1/2010 | Ray et al. ................... 455/404.2 |

* cited by examiner

*Primary Examiner* — Ronald Eisner
(74) *Attorney, Agent, or Firm* — Brannon Sowers & Cracraft PC; C. John Brannon

(57) ABSTRACT

A personal security system for automatically warning a user when an item is lost, or after being so lost is then found, wherein when the first and second transceivers are separated by a distance exceeding the predetermined operating range for a predetermined duration, the first transceiver and second transceiver each generates the predetermined signal (which may include vibration of the first and second transceivers and playing a predetermined alarm sound) for a predetermined duration; and when after being so separated, the first and second transceivers are brought back within a defined distance or operating range, the first transceiver and second transceiver each generates the predetermined signal once again for a predetermined duration. The system may include a single, second transceiver, or multiple second transceivers, each being identical except with respect to their digital signatures and settings such as range, sound, volume and duration of alarms.

10 Claims, 10 Drawing Sheets

FIG. 5 Schematic Representation of Security System with a Hand-Held Computing Device as the Sole Controller FIG. 6 Schematic Representation of Security System 6 with Panic Button/Controller Functions Tied to a Handheld Computer Device FIG. 7 Schematic Representation of Security System (20) with a Panic Button/Controller Function and Stationary and Handheld Computer Devices

SYSTEM AND APPARATUS FOR ALERTING USER OF THEFT OR LOSS, OR WHEREABOUTS, OF OBJECTS, PEOPLE OR PETS

The subject application claims priority to U.S. Provisional Patent Application No. 61/448,469 filed Mar. 2, 2011, and U.S. Provisional Patent Application No. 61/479,580 filed Apr. 27, 2011.

TECHNICAL FIELD

The novel technology relates generally to the field of personal and property security, and, more specifically, to electronic communications devices.

BACKGROUND

Miniaturization of microprocessors, memory chips, and radio frequency identification and other devices have revolutionized communications and the tracking of objects, people and animals. It is now possible to use very small devices able to wirelessly communicate a broad spectrum of data to other devices. Such devices can be affixed to, implanted in, or carried in or on almost anything, including objects, people and pets. Similarly, miniaturization of microprocessors and other technologies have dramatically increased the computing power of smaller and smaller devices. Hand-held computer devices such as "smart phones," tablet computers, and PDA's can now perform a myriad of computing functions and communicate wirelessly with a wide range of devices. Finally, new GPS technologies and Enhanced 911 dialing protocols make it possible for police, EMS and fire rescue services to respond to a call for help with the ability to precisely pinpoint caller locations.

With growing economic disparities, and just the day-to-day hustle and bustle of modern life, security and protection of persons and property can be critical. For travelers, the story of having a wallet or passport stolen while in a crowd is all too familiar. People accidentally leaving keys, eyeglasses and cellphones/PDA's in restaurants, bars, trains, planes and elsewhere is also a common occurrence. It is similarly not uncommon for children or pets to wander off or become separated from parents or owners. Finally, it is the rare person who has not lost a set of car keys, a cell phone, wallet, eyeglasses, or the like, only to find the misplaced item hiding in plain sight in a house or apartment. Thus, there is a need for a device and system to easily, automatically and instantly (i) protect users from risks of theft, loss and misplacement of animate and inanimate objects, (ii) help easily find lost items; and (iii) in certain cases, call for help when in peril and it is not safe or possible to access a phone. The present novel technology addresses these needs.

SUMMARY

The present novel technology relates to a system and method for remotely linking two or more communication devices together so as to have them emit auditory and/or vibratory alarms when the devices are either separated beyond a certain predetermined distance or brought back together within that distance. Additionally, a means for remotely activating a cell phone or like device to immediately, automatically, and (where life or limb is being threatened by assailants) silently transmit a predetermined distress message and location for responders is also presented. One object of the present novel technology is to provide an improved means for alerting users through an instant alarm that a theft or accidental loss of a possession or person has occurred. Related objects and advantages of the present novel technology will be apparent from the following description.

DETAILED DESCRIPTION OF THE PRESENTLY PREFERRED IMPLEMENTATIONS

For the purposes of promoting an understanding of the principles of the novel technology and presenting its currently understood best mode of operation, reference will now be made to the implementations illustrated in the drawings and specific language will be used to describe the same. It will nevertheless be understood that no limitation of the scope of the novel technology is thereby intended, with such alterations and further modifications in the illustrated devices and such further applications of the principles of the novel technology as illustrated therein being contemplated as would normally occur to one skilled in the art to which the novel technology relates. Some implementations may omit some of the components of the security system 1, and some implementations will include other components as well. The illustrated implementations in the drawings are intended to be exemplary only.

Figure 1:
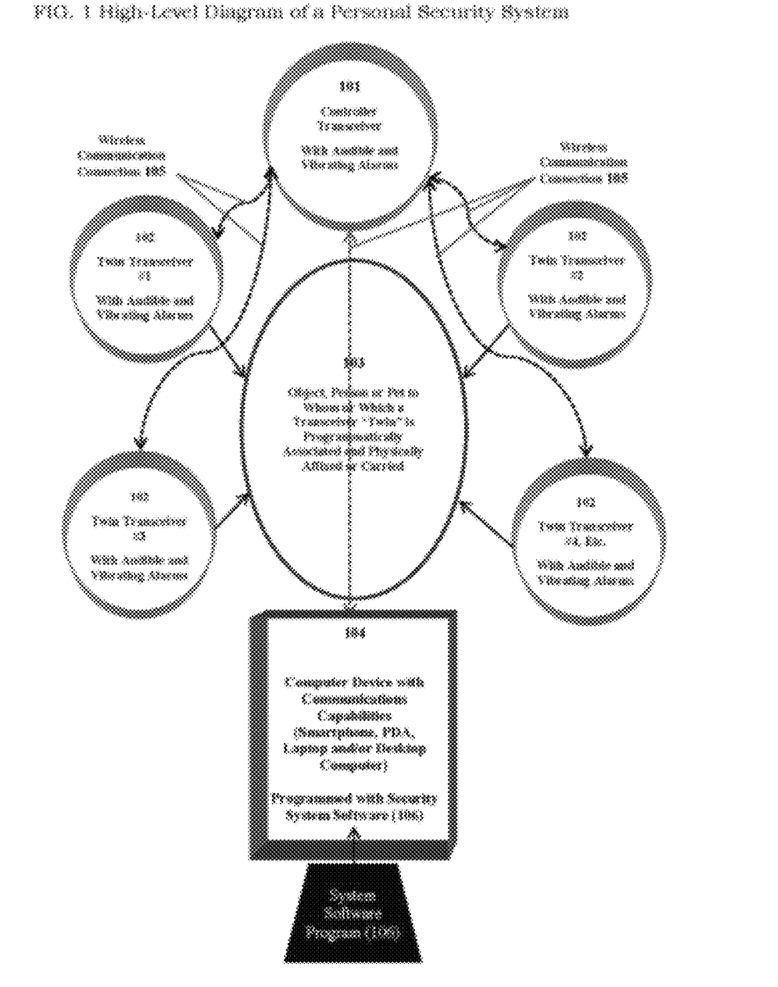
FIG. 1 is a high-level diagram of a personal security system.

FIG. 1 is a high-level diagram of a personal security system 1. FIG. 1 diagrams the personal security system 1 and its component devices and relationships. The security system 1 includes a 'Controller'/transceiver device (Controller) 101 that uses battery or other power sources and is programmed to communicate with one or more other 'Twin'/transceiver devices (each a Twin) 102 via BLUETOOTH (BLUETOOTH is a registered trademark, Ser. No. 75/643,769 and registration No. 2909356, registered to BLUETOOTH SIG, INC.. a Delaware Corporation, with an address at Suite 350, 5209 Lake Washington Boulevard, Kirkland, Wash. 98033), infrared, radio frequency, audio or other technologies 105. Typically, the Controller 101 is lightweight and small such that the Controller 101 is easily portable and even concealable. For example, the Controller 101 can typically be kept in a user's pocket or worn on a necklace or bracelet, or as a specially-designed wrist-watch. In other implementations the Controller 101 may be of waterproof and/or shock resistant design so as to be wearable in a pool, bath or shower. Typically, the Twin devices 102 are physically attached to, placed in, on or about an object 103. The object 103 can be a thing, a person, or a pet. In some implementations, the Twin devices 102 are affixed to an enclosure containing the object 103. In some implementations the system 1 may also include one or more computer devices 104. In such implementations, one or more of the one or more computer devices 104 may have telecommunication, radio communication, or the like capabilities. The system software program 106 is installed on the computer devices 104.

Figure 6:
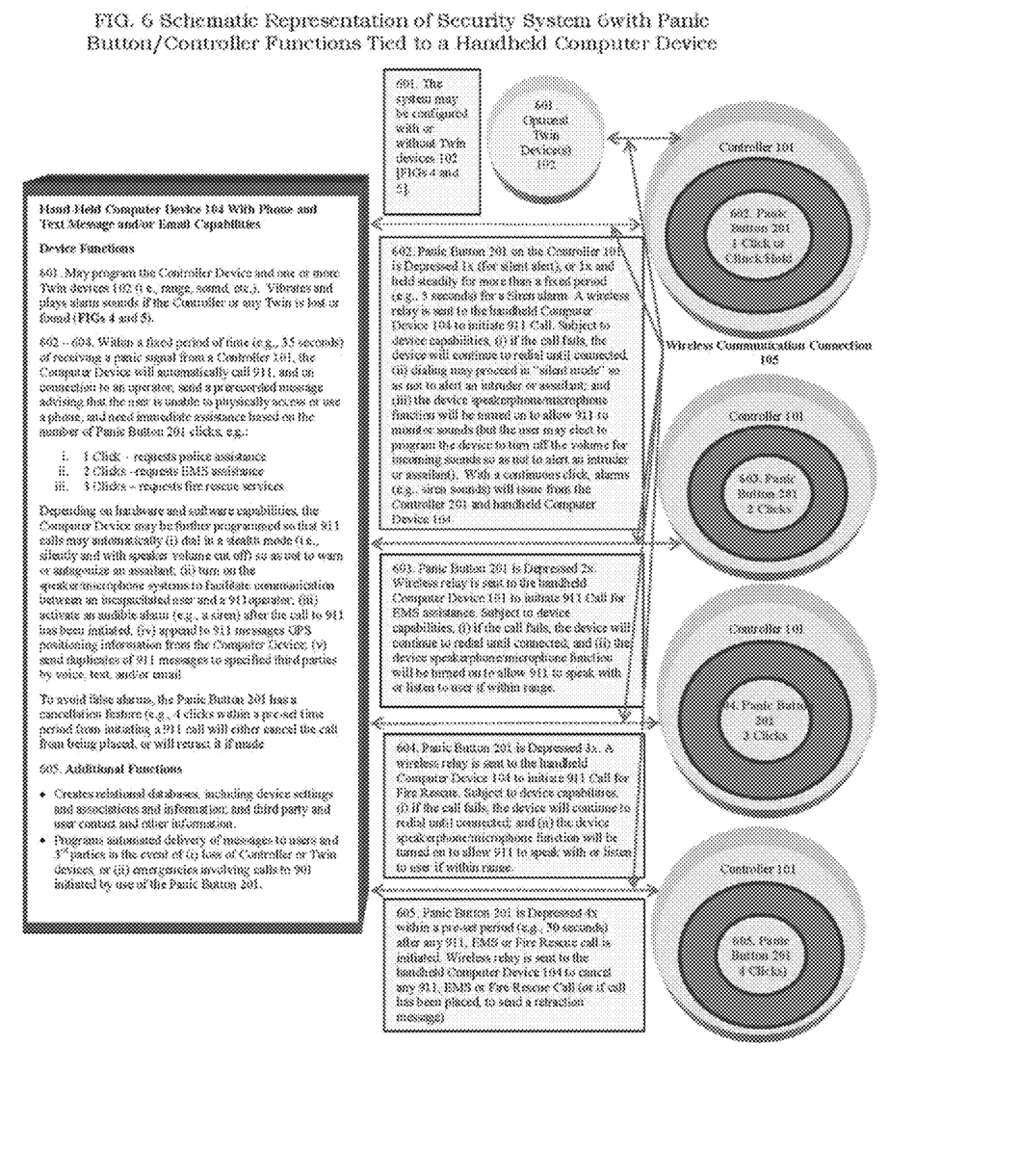
FIG. 6 is a schematic demonstrating the functionality of the personal security system that includes (i) a Controller/transceiver device with a built-in 'Panic Button'/actuator device (Panic Button) that can automatically initiate distress calls and messages to 911 and third parties in the event of emergencies; (ii) one or more Twin/transceiver devices; (iii) and a hand-held Computer Device.
Figure 7:
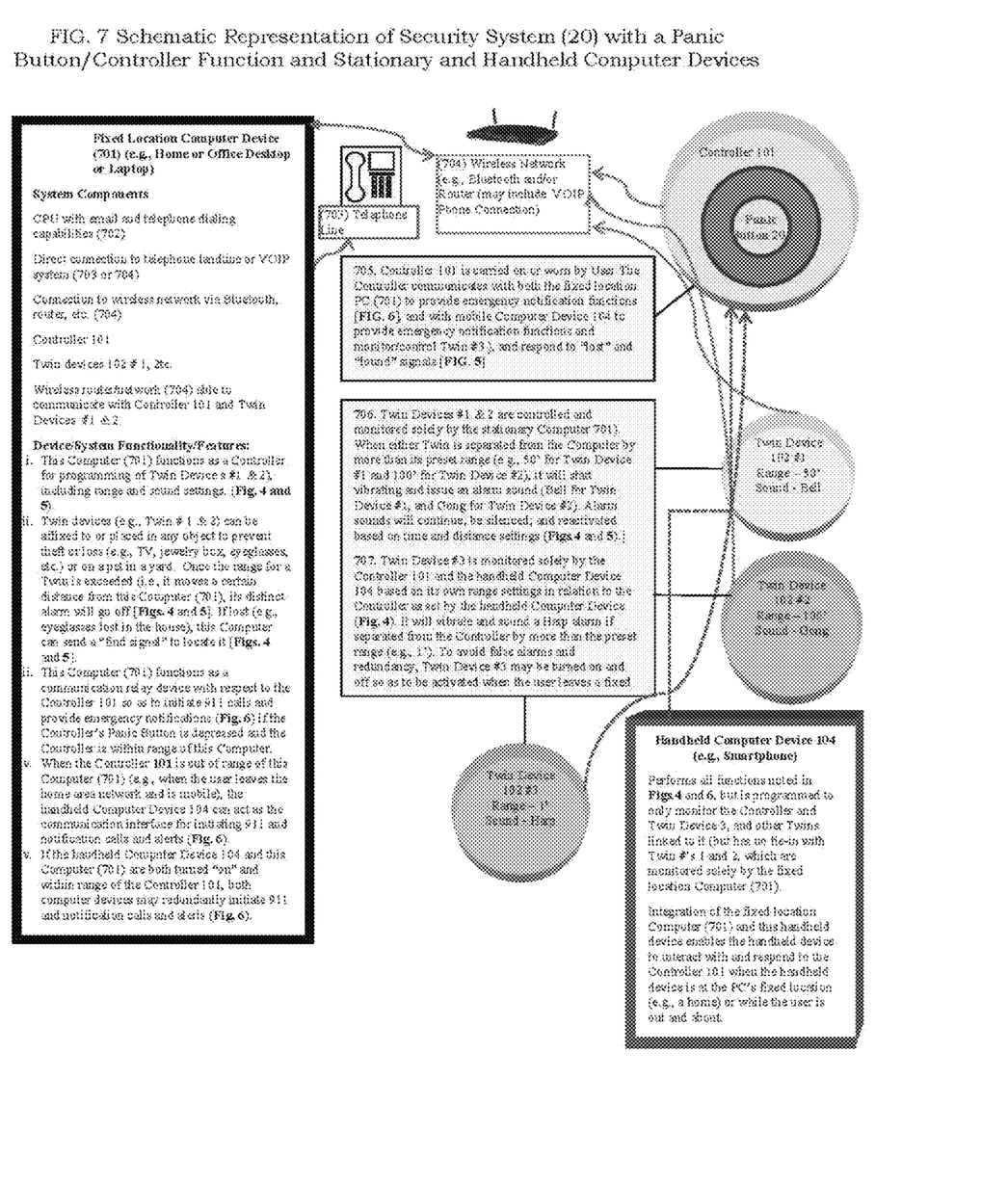
FIG. 7 is a schematic demonstrating the functionality of the personal security system that includes (i) a Controller/transceiver device with a Panic Button; (ii) one or more Twin/transceiver devices; (iii) a fixed-location Computer Devices (e.g., a PC or laptop); and (iv) optional handheld Computer Device.

In other implementations of the system 1, the Controller 101 may include a built-in actuator/Panic Button 201 that automatically causes a Computer Device 104 to dial 911 or other numbers and solicit help. FIG. 6 and FIG. 7 further elaborate upon such functionality associated with the actuator/panic button 201. The volume and sound of the audible alarm for the Controller 101 and each Twin 102 (and in certain implementations, a Computer Device 104 can be set by the user to possess a distinguishing sound and/or volume.

Figure 3:
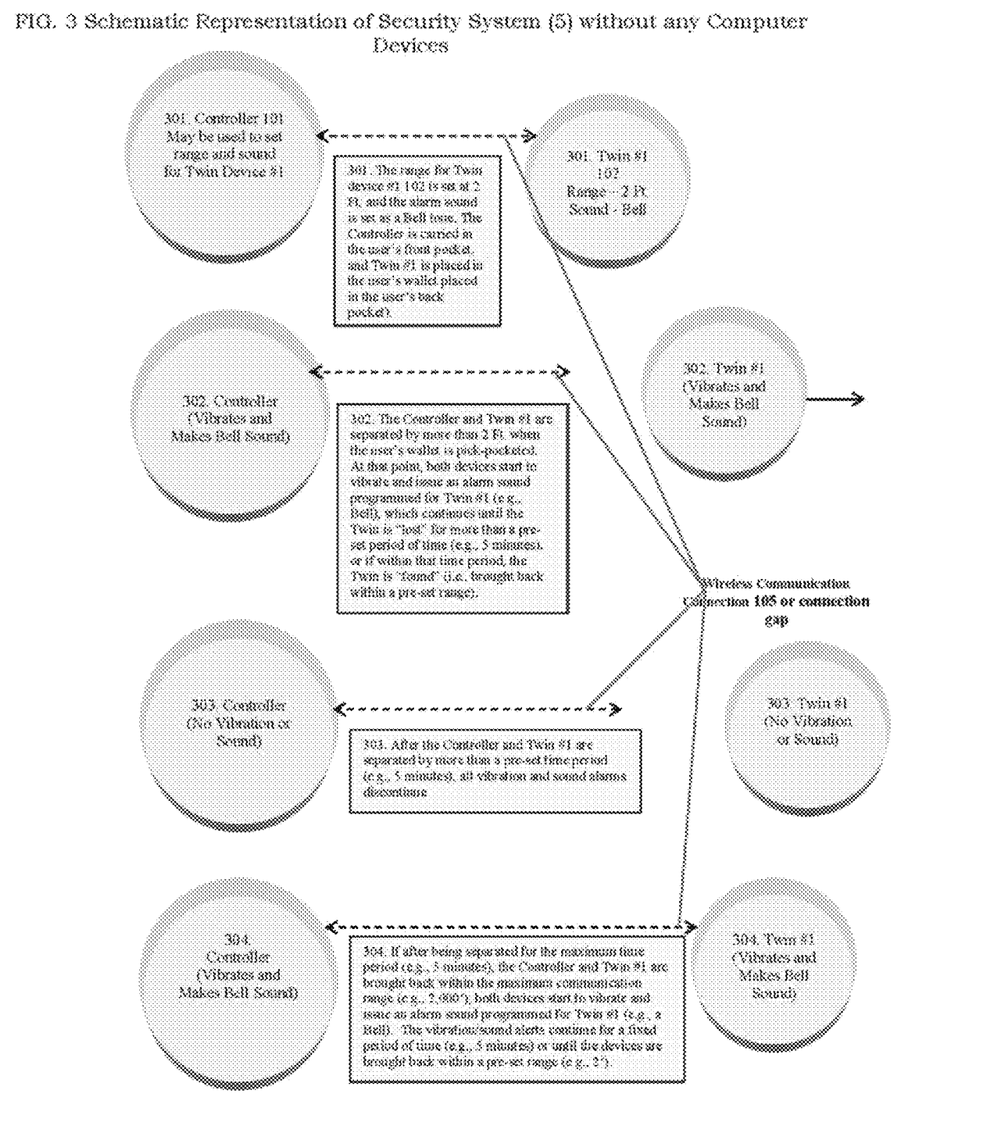
FIG. 3 is a functional representation of the personal security system with a 'Controller'/transceiver device (Controller) and one or more 'Twin'/transceiver devices (each a Twin).
Figure 4:
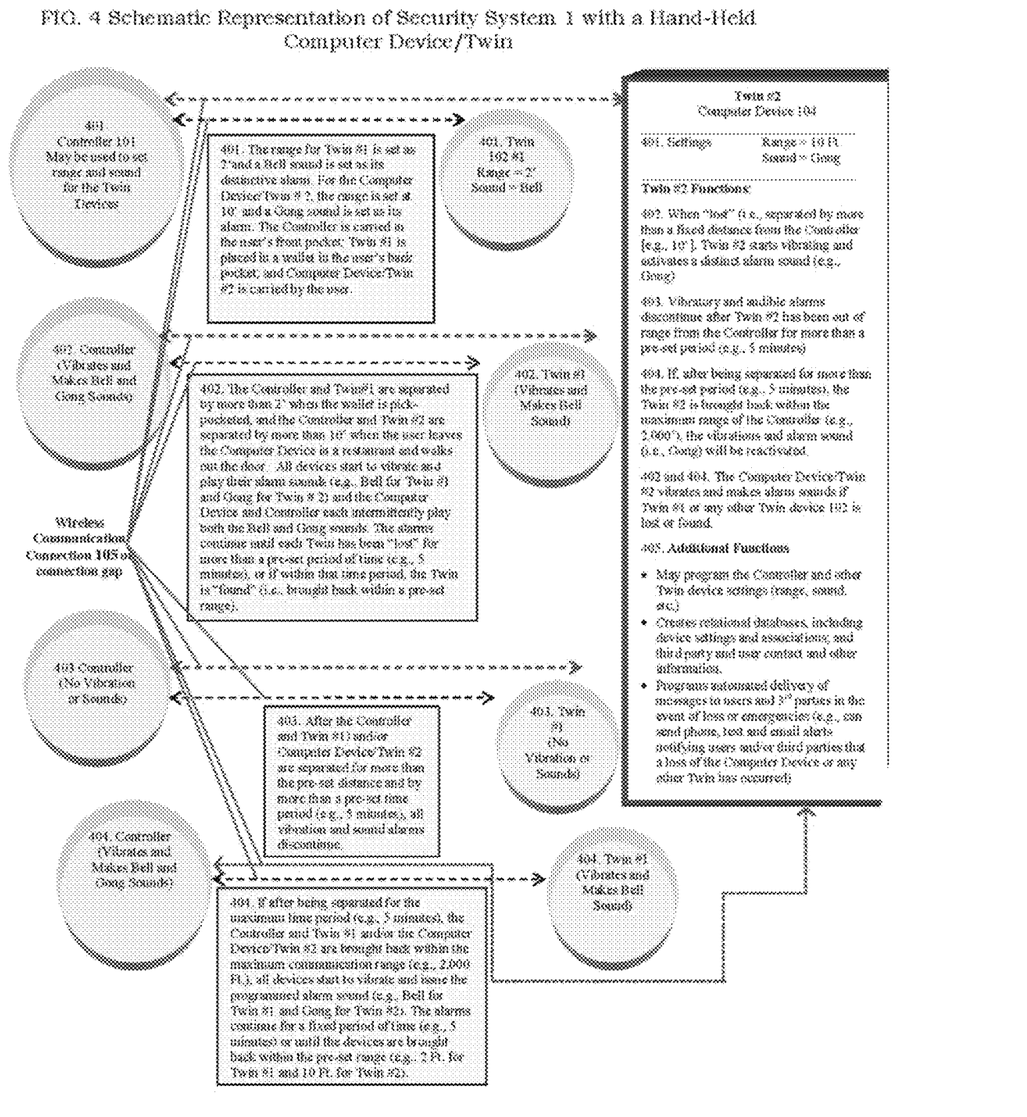
FIG. 4 is a schematic demonstrating the functionality of the personal security system that includes (i) a computer device (Computer Device) such as a smartphone, PDA, touchpad, PC or laptop on which a software program for the system (Security System Software) has been installed; (ii) one or more Twin/transceiver devices; and (iii) a Controller/transceiver device.
Figure 5:
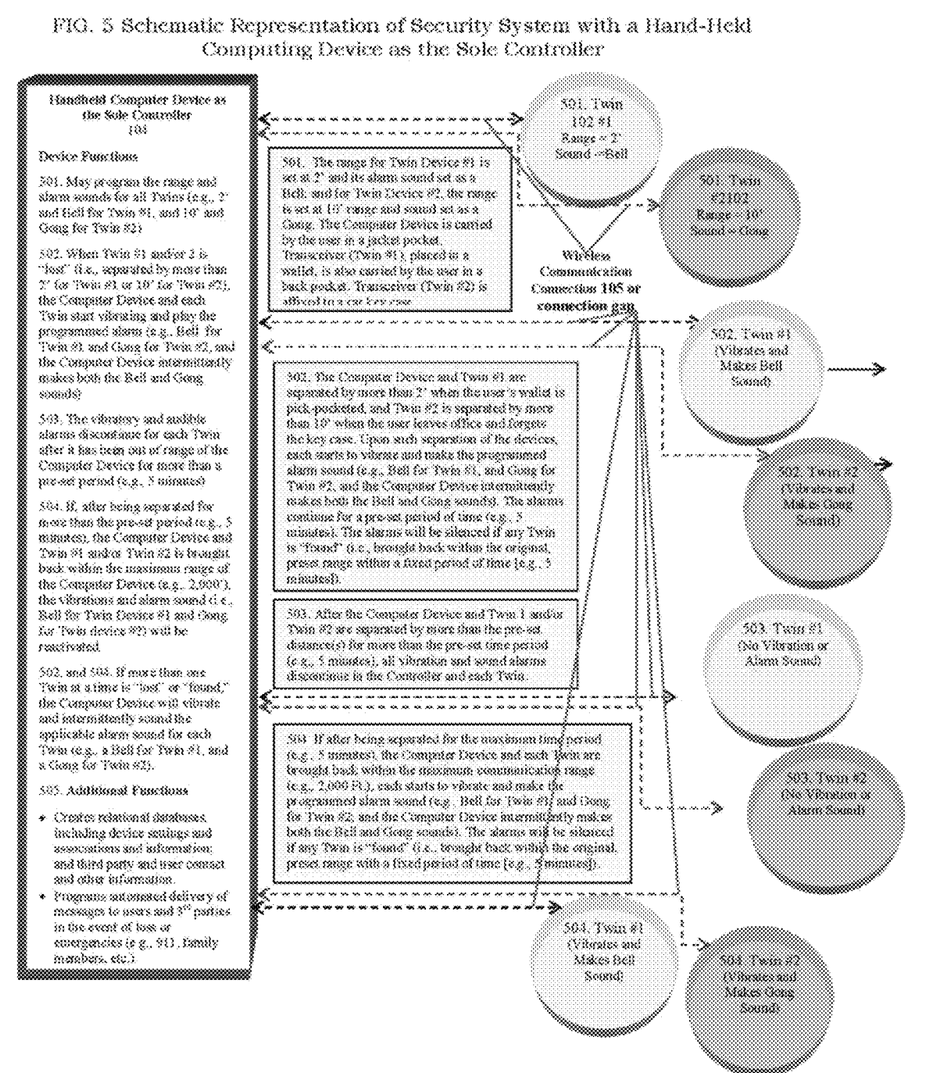
FIG. 5 is a schematic demonstrating the functionality of the personal security system that has no separate Controller/transceiver device; but includes (i) one or more Twin/transceiver devices; and (ii) a Computer Device.

In operation, the Controller device 101, having the form of a fob or like object is actuated automatically to emit a sound and/or vibration once either (i) a communication link to a Twin device 102, which also has the form of a fob or like object is broken by virtue of the Controller and Twin being separated from each other by more than a programmable, defined distance or range as the result of theft, inadvertence or other reasons; or (ii) after being separated, the Controller and a Twin device are brought back within the defined distance or range of each other (FIGS. 3-5). Each Twin device 102 has an individualized digital signature recognized by the Controller device 101 (an in some implementations a Computer Device 104) through the wireless communication system 105 so as to distinguish it from other Twin devices that may be part of the security system 1. In certain implementations a Computer Device 104 may function as a Controller 101 or Twin device 102 (FIGS. 4 and 5).

The Controller 101, and in some implementations, the Computer Device 104 may set the distance or range for each Twin 102, and if the person, object or pet 103 to which a Twin is affixed moves beyond that distance or range, an alarm (audible and/or vibratory) is set off in both the Controller and the Twin (and in certain implementations, a Computer Device 104). The system 1 can also be used in reverse so that, by example, if after moving beyond the preset distance or range, an object, person or pet to which a Twin 102 is attached moves back within range of the Controller, such alarm will again be set off in all devices.

The Twin devices 102 are small (e.g., the size of a Quarter or Half Dollar coin), programmable transceivers operated by battery or other power source. Twins 102 may be carried upon or in an object, person or pet 103 or attached through various means, including adhesive backing, an eyelet permitting the Twin to be worn on a necklace, bracelet, etc. Each Twin 102 is programmable through its own user interface (or in some implementations by the Controller 101 or Computer Device 104) so as to have a distinct alarm sound and volume. As schematically shown in FIGS. 3-5, when separated from the Controller 101 by more than a distance or range that may be adjustable and prescribed by a user, the Twin 102 and Controller 101, and in certain implementations a Computer Device 104, each emits the distinct alarm sound programmed for such Twin for a fixed period of time. Conversely, once separated by being moved beyond the prescribed distance or radius, the alarms will again sound in the Twin 102 and Controller 101, and in certain implementations, the Computer Device 104 once the Twin is brought back within range of the Controller (and in certain implementations, the Computer Device).

Devices in the system 1 communicate with each other using BLUETOOTH, IEEE standard 802.11, radio wave, infrared, or other technologies 105. In that way the Controller 101 and/or one or more Computer Devices 104 can communicate with and control the operations of, one or more Twin devices 102, including setting sound alert tones and volumes, and prescribing distances and/or radiuses governing when alarms are triggered, etc.

Figure 2:
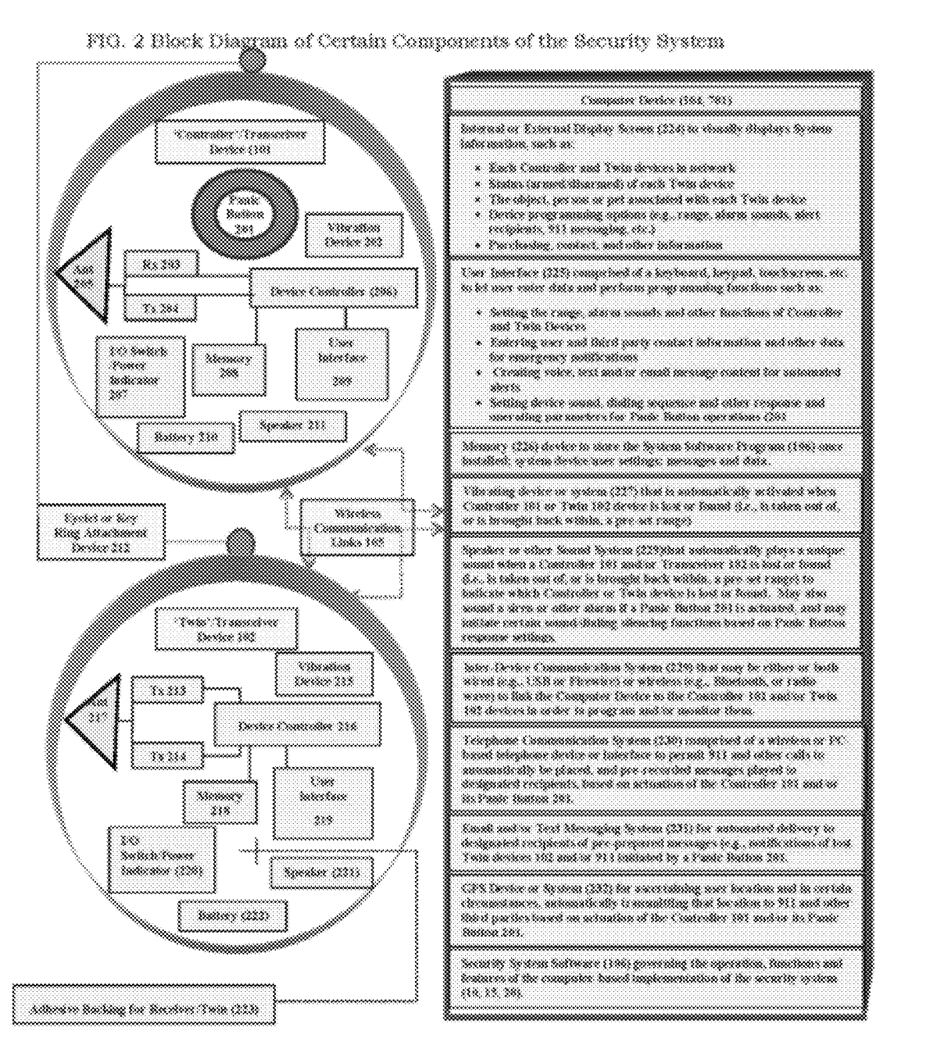
FIG. 2 is a block diagram of certain components of the personal security system.

FIG. 2 is a block diagram of certain components of the personal security system. FIG. 2 illustrates certain internal components of the devices included in the personal security system 1, which are intended to be exemplary only. The Controller 101 includes a housing (which in certain implementations may be of waterproof design) containing circuitry and other components that may include the following:

(i) In certain implementations a built-in actuator (Panic Button) 201 capable of initiating automated dialing and messaging functions in a Computer Device 104 in the event of emergencies (FIGS. 6 and 7).

(ii) A vibration device 202 that causes the Controller to vibrate as an indicator that a 'Twin'/transceiver device 102 in the system 1 has been lost or found: i.e., has been moved beyond a pre-set distance or range from the Controller 101, or once out of range, has been brought back within a pre-set distance or range from the Controller 101 (FIGS. 3-5).

(iii) Circuitry for external data and other communications with one or more Twin devices 102 and in certain implementations Computer Devices 104, including a receiver 203, a transmitter 204, and an antenna 205. The antenna 205 transforms electromagnetic energy to electrical signals provided to the receiver 203, and transforms electrical signals from the transmitter 204 to electromagnetic energy for transmission to remote radio receivers in one or more Twin devices and in certain implementations, one or more Computer Devices 104. The receiver 203 responds to the electrical signals from the antenna 205 to produce detected data for the controller device 206. The receiver 203 may include circuits such as filters and demodulators. The transmitter 204 responds to formatted data from the controller device 206 to provide the electrical signals to drive the antenna 205. The transmitter 204 may include circuits such as modulators and filters. The antenna 205, the receiver 204 and the transmitter 203 together form a radio communication circuit for two-way radio or other wireless communication with remote radio devices such as one or more Twin devices 102, and in certain implementations one or more Computer Devices 104.

(iv) A controller device 206 to control the operation of the Controller 101. The controller device 206 may be implemented as a processor, microprocessor, digital signal processor (DSP), or any other logic circuit or combination of circuits providing control functions. The controller device 206 operates in response to data and program instructions stored in the memory 208. In one mode the controller device 206 controls the radio or other wireless communication circuit by directing the tuning, activation, and deactivation of the circuit.

(v) An on-off switch 207, which in certain implementations may include an LED or other indicator to show when the Controller device 101 is active.

(vi) A memory unit or device 208 capable of storing data and program instructions.

(vii) A user interface 209 lets a user control the Controller device, which in certain implementations includes a pushbutton, touchscreen, or other built-in actuator device to let the user to select programming options for the Twin device (e.g., alarm sounds, volume and range settings), and a display screen sufficiently large to display requisite programming and other information for the Controller 101. In certain implementations the user interface may enable the user to select programming options for Twin devices 102 (e.g., alarm sounds and range settings).

(viii) A battery or other power source 210 to operate the Controller 101.

(ix) A speaker or other sound system 211 capable of emitting a variety of sounds (e.g., siren, beep, whistle, gong, etc.) to indicate that a Twin device 102 (which in certain implementations may include a Computer Device 104) has been lost or found (i.e., has moved beyond a preset distance or range, or is brought back within a preset distance or range (FIGS. 3-5)).

(x) An eyelet 212 or similar construction or attachments to the housing through which a chain, ring, etc. may be inserted so as to enable a user to easily carry the Controller on a keychain or wear it on a necklace or bracelet. In certain implementations the Controller device may also take the form of, or be incorporated into, a wrist watch or worn on the wrist through a watch band device.

As also shown in FIG. 2, each 'Twin'/transceiver device 102 includes a housing containing circuitry and other components that may include the following:

(i) Circuitry for external data communication with the Controller device 101 and in certain implementations one or more Computer Devices 104, including a receiver 213, a transmitter 214, and an antenna 217. The antenna 217 transforms electromagnetic energy to electrical signals provided to the receiver 213, and transforms electrical signals from the transmitter 214 to electromagnetic energy for transmission to remote radio receivers in the Controller Device 101 and in certain implementations one or more Computer Devices 104. The receiver 213 responds to the electrical signals from the antenna 217 to produce detected data for the controller device 216. The receiver 213 may include circuits such as filters and demodulators. The transmitter 214 responds to formatted data from the controller device 216 to provide the electrical signals to drive the antenna 217. The transmitter 214 may include circuits such as modulators and filters. The antenna 217, the receiver 214 and the transmitter 213 together form a radio communication circuit for two-way radio or other wireless communication with remote radio devices such as the Controller 101 and in certain implementations one or more Computer Devices 104.

(ii) A vibration device 215 that causes the Twin device 102 to vibrate as an indicator that it has been lost or found: i.e., has been moved beyond a pre-set distance or range from the Controller 101, or in certain implementations a Computer Device 104; or once out of range, has been brought back within a pre-set distance or range from the Controller and/or Computer Device as the case may be (FIGS. 3-5).

(iii) A controller 216 to control the operation of the Twin device 102. The controller device 216 may be implemented as a processor, microprocessor, digital signal processor (DSP), or any other logic circuit or combination of circuits providing control functions. The controller device 216 operates in response to data and program instructions stored in the memory 218. In one mode the controller device 216 controls the radio or other wireless communication circuit by directing the tuning, activation, and deactivation of the circuit.

(iv) A memory unit or device 218 capable of storing data and program instructions.

(v) A user interface 219 that lets a user control the Twin device 102 and in certain implementations, includes a pushbutton, touchscreen, or other built-in actuator device to let the user to select programming options for the Twin device (e.g., alarm sounds, volume and range settings), and a display screen sufficiently large to display requisite programming and other information for the Twin device 102.

(vi) An on-off switch 220, which in certain implementations may include an LED or other indicator to show when the Twin device 102 is active.

(vii) A battery of other power source 222 to operate the Twin device 102.

(viii) A speaker or other sound system 221 capable of emitting a variety of sounds (e.g., siren, beep, whistle, gong, etc.) to indicate that the Twin device 102 has been lost or found (i.e., has been moved beyond a pre-set distance or range from the Controller 101, or in certain implementations a Computer Device 104; or once out of range, has been brought back within a pre-set distance or range from the Controller and/or Computer Device as the case may be (FIGS. 3-5)).

(ix) An eyelet 212 or similar construction or attachments to the housing through which a chain, ring, etc. may be inserted so as to enable a user to easily carry the Twin device 102 on a keychain or wear it on a necklace or bracelet. Twin devices 102 may also have adhesive, Velcro or similar backing systems to allow the same to be affixed to objects 223.

As also shown in FIG. 2, the system 1 may include one or more computer devices 104 (Computer Devices) that have been programmed with the software program 106 for the system (Security System Software). Computer Devices may include a programmable cell phone (i.e., smartphone), PDA, and other handheld computer pad, tablet or similar device with telephone/email functionality, and in certain implementations may also include a desktop or laptop computer 701. Each Computer Device has a construction, circuitry, operating system, email, text messaging and other software, processing and other features and abilities typically found in "off the shelf" products in the marketplace, including:

(i) A display/monitor screen 224 or monitor enabling a user to view menu options, obtain information about and program the Controller 101 and/or Twin devices 102.

(ii) A user interface 225 to let a user control the Computer Device 104, which in typical implementations, may include a (a) keypad, touchscreen or other device for entering data and initiating actions, (b) a display screen, (c) a microphone and speaker, and the Security System Software 106 and one or more other software application programs for controlling the Computer Device and other devices, processing received data, and producing a display based on the data. In the particular exemplary implementation described herein the user interface 225 includes a display screen 224 sufficiently large to display graphical and other data and text, and modalities for enabling a user to input information, make selections, create messages for automated delivery, and perform other tasks relevant to the operation of the system 1.

(iii) A memory unit or device 226 capable of storing data, messages, program instructions and other information critical to the operation of the system 1.

(xi) In certain implementations a vibration device 227 that causes the Computer Device 104 to vibrate as an indicator that a Controller 101 and/or Twin device 102 in the system 1 has been lost or found (i.e., has moved beyond a preset distance or range, or is brought back within a preset distance or range (FIGS. 3-6).

(xii) A speaker or other sound system 228 capable of emitting a variety of sounds (e.g., siren, beep, whistle, gong, etc.) to indicate that a Controller 101 or Twin device 102 in the system 1 has been lost or found (i.e., has moved beyond a preset distance or range, or is brought back within a pre-set distance or range (FIGS. 3-6)).

(i) Circuitry and functionality 229 for external data communication with network devices so as to permit communication with the Controller 101 and/or Twin devices 102. Communications may be either or both wired (e.g., USB or FIREWIRE (FIREWIRE is a registered trademark, Ser. No. 74/802,629 and registration No. 1947728, registered to Apple Computer, Inc., a California corporation located at 1 INFINITE LOOP, Cupertino, Calif. 95014)) or wireless methods and devices (e.g., BLUETOOTH, or IEEE standard 802.11 or related standards, or other radio wave or wireless protocols). In certain cases the Computer Device may utilize a network interface (e.g., a digital modem or transceiver circuit for digital data communication) to link the Computer Device 104 with the Controller 101 and/or Twin devices 102. Alternatively, the network interface may be a wireless circuit of any suitable type for wireless communication. The wireless interface 105 may communicate according to a wireless protocol (e.g., BLUETOOTH, IEEE Standard 802.11 and related standards, and cellular and Personal Communication System (PCS) transceiver circuits). Also, circuits which communicate using unlicensed frequency bands may be used for data communication among system devices.

(xiii) Telephone communication system 230 for automatically dialing 911 and placing other calls, and playing pre-recorded messages to designated recipients based on loss or theft of a Twin device 102 or Controller 101, and/or a user pressing a Panic Button 201.

(xiv) Email and/or text messaging system 231 for automatically delivering pre-prepared messages to designated recipients based on loss or theft of a Twin device 102 or Controller 101, and/or a user pressing a Panic Button 201.

(xv) GPS Device or System 232 for ascertaining user location and in certain circumstances, automatically transmitting that location to 911 and other third parties based on loss or theft of a Twin device 102 or Controller 101, and/or a user pressing a Panic Button 201.

(v) Software application programs and the Security System Software 106 to enable the Computer Device to perform conventional operating functions and the novel functions of the system 1; process received data; and produce a display based on the data. The Security System Software and application may be configured as computer readable program code and stored in the device's memory 226.

FIG. 3 illustrates a first implementation of the present, novel personal security system 1 system for automatically initiating an audible and/or vibratory alert in a first or transceiver device, Controller 101 and one or more second transceiver devices (Twins) 102. Alerts are triggered in one of two ways: (i) the devices are separated from each other by a predetermined distance or range (such as through theft or oversight); and/or (ii) the devices are brought back within a predetermined distance or range of each other after having been separated. Each Twin device in the system 1 has a unique sound so as to distinguish it from other Twin devices. The same sound programmed for a Twin device is also programmed to play in the Controller to alert a user that a particular Twin device has been lost or found. The system's Twins devices 102 can be attached, affixed, inserted into, or worn on an object, person or pet 103. Each Twin device has a unique digital signal that allows the Controller device, through the wireless communication link 105, to distinguish that Twin device from others. The Controller device has unique digital signals that allow it, through the wireless communication link 105, to communicate with each Twin device in the system 1 (i.e., a distinct signal tuned to each Twin device).

The Controller device 101 maintains a communication link via a BLUETOOTH, infrared, radio or like short-range communication system 105 with one or more of the Twin devices 102. Twin device 102 may be pre-programmed or programmed by a user via the device's user interface 219 or other internal mechanism, or via the Controller device 101 by a communication link 105) to (i) generate a distinct sound that distinguishes it from other Twin devices in the system 1, and (ii) to have a set distance or range from the Controller, so that if it moves beyond that range or distance, alarms will go off in the Twin and Controller. The Controller device 101 can be programmed as well so that its alarm sound will be identical to the alarm sound of each Twin device.

As schematically demonstrated (301-304), when the Controller 101 and a Twin device 102 in the system 1 are separated by more than a pre-set distance or range, alarms are triggered in each device. For example, if a Twin with a 2' range is placed inside a user's wallet and a Controller is in the user's front pocket, vibration and audible alarms would go off in the Twin and Controller if a pickpocket were to take the wallet beyond 2' from the owner's pocket, or if the user were to leave the wallet on a table and walk out of a restaurant. The alarms would continue for a pre-set period of time (e.g., 5 minutes) and then would discontinue; but would be reactivated if the Controller and wallet with the Twin were brought back within the maximum communication range of the devices (e.g., 2,000').

The system 1 may include numerous Twin devices 102 (e.g., 5-10), each of which would function in the same manner with respect to triggering alarms when moving beyond, or back into, a pre-set distance or range from the Controller device 101. The Controller 101 is programmed to distinguish each Twin by its special digital signature (e.g., frequency), and to communicate a separate digital signal to each Twin device linked to the Controller 101 through the wireless communication system 105. The Controller 101 will store a unique alarm sound for each Twin device 102 (e.g., gong, bell, siren, etc.) and play that alarm sound if the Twin 102 moves out of, or back into, the pre-set distance or range. The Controller 101 will intermittently play the unique alarm sound for each if more than one Twin device 102 at a time is moved out of the pre-set distance or range, or brought back within that distance or range.

FIG. 4 illustrates a second implementation of the present novel technology underlying the personal security system 1. That implementation incorporates a Computer Device 104 into the system 1 as one of the Twin/transceiver devices 102. The system 10 includes a Controller 101 that communicates with one or more Twin devices 102, including a Computer Device 104, via a BLUETOOTH, infrared, radio or like short-range communication system 105. Typically, the Controller and Twin devices (FIG's 101 and 102) and related Computer Device 104 include built-in alarm systems to vibrate and play a distinct sound alerting a user as to when (i) the Controller and Twin (which in this implementation includes a Computer Device) have been separated by more than a programmable distance or range from each other; and (ii) after having been separated for more than a defined period of time (e.g., 5 minutes), are brought back in a programmable distance or range of each other.

With the Security System Software 106 installed in it, the Computer Device establishes a communication link via a BLUETOOTH, infrared, radio or like short-range communication system 105 with the Controller device 101, which in turn may maintain a communication link 105 with one or more Twin devices 102 in the system 1, including the Computer Device 104. Range, alarm sounds, and other settings for the Controller 101, Twin devices 102, and Computer Device may be internally programmed by user interfaces in each device, or through the Controller and/or Computer Device via the wireless communication system 105.

As illustrated in 401-404, the Computer Device 104 establishes a communication link with a Controller device 101 and in some implementations may program the Controller device to set the range, alarm sounds, volume, and other settings for each Twin device 102 in the system 1. The Computer Device 104 functions as a Twin device as well. When the Controller 101 and the Computer Device 104 are separated by more than a pre-set distance or range, identical alarms are triggered in both devices. The alarms include vibration in each device and a distinct alarm sound that identifies the Computer Device (e.g., siren, gong, fog horn, bell, etc.). The same alarm sound that is programmed to issue from the Computer Device 104 issues from the Controller 101 as well. Once the Controller 101 and Computer Device 104 are separated by more than the pre-set range, the alarms in each device continue to sound for a predetermined period of time (e.g., 5 minutes) or until the devices move beyond their communication range (e.g., 2,000 ft.); after which, each device is silenced. If, after being separated for more than the prescribed time period or distance the Controller and Computer Device are brought back within range, the alarms will again ring for the pre-set period of time. In this way, a user is alerted when the Computer Device 104 or Controller device 101 is lost or found. In addition and as with the Controller, the Computer Device vibrates and issues a distinct alarm sound for each Twin device when that device is lost or found.

The system 1 may include numerous Twin devices, each of which would function in the same manner with respect to separation from the Controller. The Controller and Computer Device is each programmed to distinguish each Twin by its digital signal (e.g., frequency), and play the Twin's unique sound (e.g., gong, bell, siren, etc.) when it is lost or found. The Controller is also programmed to communicate a separate digital signal that is recognized by each Twin device linked to the Controller through the wireless communication system 105. The Controller will store a unique alarm sound for each Twin device (e.g., gong, bell, siren, etc.) and play that alarm sound if the Twin moves out of, or back into, the pre-set distance or range. The Controller will intermittently play the unique alarm sound for each if more than one Twin device at a time is moved out of the pre-set distance or range, or brought back within that distance or range.

FIG. 5 illustrates a third implementation of the present novel technology underlying the personal security system 1. That implementation replaces a Controller 101 device with a Computer Device 104. With the Security System Software 106 installed, the Computer Device establishes a communication link via a BLUETOOTH, infrared, radio or like short-range communication system 105 with all Twin devices 102 in the system 1, and in some implementations can program their range, alarm sounds, volume and other settings.

As illustrated in 501-508, when the Computer Device 104 and any Twin device 102 are separated by more than a pre-set distance or range, identical alarms are triggered in each device. The alarms include vibration in each device and a distinct alarm sound for each Twin device (e.g., siren, gong, fog horn, bell, etc.). The same alarm sound that is programmed to issue from a Twin device 102 issues from the Computer Device 104 as well. Once the Computer Device 104 and a Twin/transceiver device 102 are separated by more than the pre-set range, the alarms in each device continue to sound for a predetermined period of time (e.g., 5 minutes); after which, each device is silenced. If, after being separated for more than the prescribed time period, the Computer Device 104 and Twin device 102 are brought back within range, the alarms will again go off and play for the pre-set period of time (e.g., 5 minutes). In this way, a user is alerted when a Twin device 102 or the Computer Device 104 is lost or found. If the Computer Device 104 is lost or taken, or is later found (i.e., brought back within range), vibration and auditory alarms sound in all of the Twin devices 102.

FIG. 6 illustrates a fourth implementation of the present novel technology underlying the personal security system 1 that may include all of the functions for the system 1 illustrated in FIG. 6, and also includes a built-in actuator device/Panic Button 201 as part of the Controller device 101. Operationally (and as shown in FIGS. 1-4), by pressing the Panic Button, a user can automatically cause a handheld Computer Device 104 to dial 911 for help and send distress messages in emergency situations even if the user is unable to physically access the Computer Device. Pressing the Panic Button a specified number of times automatically causes the Computer Device to dial 911 and send a pre-recorded message requesting a specific type of assistance (e.g., 1 click=police assistance; 2 clicks=emergency medical services (EMS) assistance; and 3 clicks=fire rescue assistance). In addition if a user continuously presses the actuator/Panic Button, a siren or other alarm sound may be played from both the Controller and Computer Device. The user may cancel a distress call by pressing the actuator/Panic Button a pre-set number of times (e.g., 4 clicks).

As also illustrated in FIG. 6, the system 1 may be configured so that certain 911 calls dial silently and turn off sounds from the Computer Device's speakers so as not to alert an assailant or intruder that a distress call is being placed. In addition to 911 messages, the Computer Device may be programmed to send duplicate messages to third parties after an automated 911 call is placed.

FIG. 7 illustrates a fifth implementation of the present novel technology underlying the personal security system 1 that may include all of the functions for the system 1 illustrated in 6, but includes the use of a fixed-location Computer Device 701, such as a home or office PC or laptop with telephone and email functionality. Operationally (and as shown in FIG. 7), by pressing the actuator/Panic Button 201 on a Controller device 101 in a wireless network 704, a user can automatically cause a Computer Device 701 in a home, office or other fixed location with telephone communication capabilities 703 to dial for help in an emergency. This implementation may also integrate a handheld Computer Device 104 into the system 1 to similarly respond to the Panic Button 201 when the user is outside of a static location. As illustrated in FIG. 7, the devices in this system 1 may perform all or substantially all of the functions, and have substantially all of the features, noted in FIGS. 4, 5 and 6, including the ability to automatically dial 911 and send pre-recorded messages in the event of an emergency by pressing the Controller's Panic Button 201.

When the Controller 101 is out of range of the stationary Computer 701 (e.g., when the user leaves the home area network and is mobile), the handheld Computer Device 104 can act as the communication interface for initiating 911 and other calls and sending alerts (FIG. 6). If the handheld Computer Device 104 and the stationary Computer Device 701 are both turned "on" and within range of the Controller 101, the closest Computer Device will initiate 911 dialing and notification alerts (FIG. 6). Integration of the fixed location Computer Device 701 and a handheld Computer Device enables the handheld device to interact with and respond to the Controller 101 when the handheld device is at a fixed location (e.g., a home or office) or while the user is out of range of the fixed-location Computer Device 701. Similarly, and as illustrated in FIG. 7, the static Computer Device 701 and handheld computer device 104 can provide "lost and found" functions by monitoring one or more Twin devices 102 in the home or on the go as illustrated in FIGS. 4-5).

Figure 8:
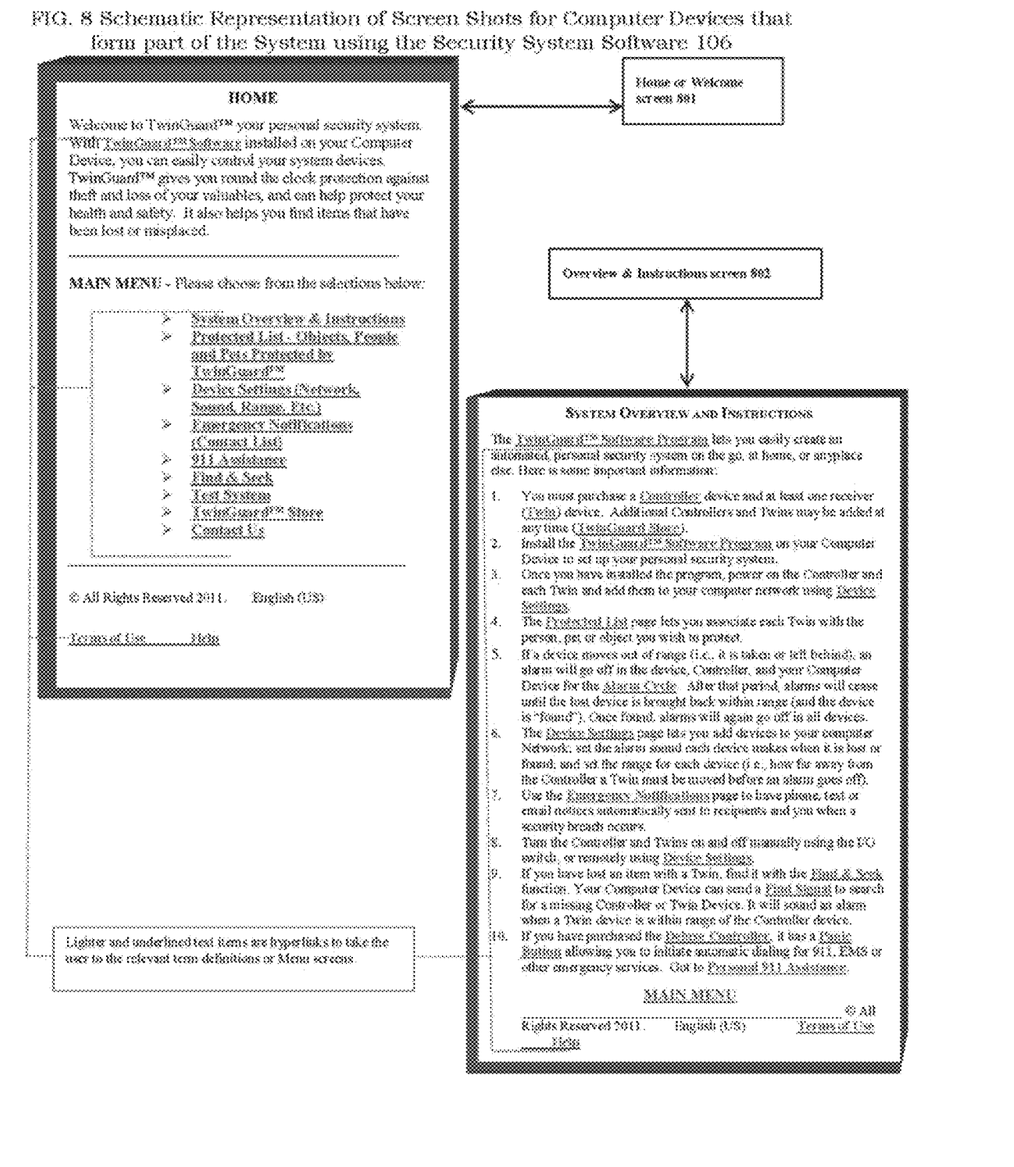
FIG. 8 illustrates sample display screens of Computer Devices in the security system based on menus and other features of the Security System Software.

FIG. 8 illustrates one implementation of a menu system and other screen shots for the Security System Software 106 that is installed on each Computer Device 104 in the system 1. The illustrations in FIG. 8 underscore certain of the functionalities of the system (including those illustrated in FIGS. 4-7) and "look and feel" of the Security System Software 106. It is to be noted that the illustrated menu system and screen shots are exemplary only. Other menu systems and screen shots may be readily developed and provide additional functionalities and capabilities.

801 is a sample screen shot of a Home Page and main menu of the Security System Software program for Computer Devices in the system 1 illustrated by FIGS. 4-7. The Main Menu gives users various options for configuring and using the system; obtaining answers to questions; configuring system devices; checking the status of system devices; purchasing additional devices; setting up 911 messages and alerts; etc. The selections of sub-pages accessed through the main menu 801 are illustrated in 802-810. By clicking on a link to a sub-page in the main menu 801, the user is taken to the relevant sub-page. From any sub-page 802-810, by clicking on a Main Menu link, the user would be returned to the Home/Main Menu 801.

The System Overview and Instructions page 802 provides the user with brief descriptions of different system components and software features. This page instructs the user in the operation of the system/program and describes its component devices and functions. By clicking on any definitional or descriptive item highlighted on this page, the user would either be taken to another sub-page with information or actions the user may perform (e.g., programming or testing devices), or the user would be taken to another sub-page providing further information and/or definitions.

The Protected List page 803 provides the user with a detailed inventory of devices 102 in the system 1; the objects, people or pets 103 with which the Twin devices are associated; and the range, sound and volume settings for each system device. The page also allows the user to see the status ("on" or "off") of system devices, and to see settings for any Controller device 101 with a Panic Button 201 functionality (e.g., the number of clicks needed to summon police assistance; whether silent dialing is turned on or off; and whether audible alarm sounds are activated). Finally, from this page, the user can see the types of alert messages and recipients that have been programmed into the system. The user may modify settings shown on this page and add information by clicking on a "Device Settings" link; and can also modify or add contacts and messages for alerts by clicking on an Emergency Notification link (i.e., the parties that would be notified automatically by delivery from the Computer Device of a pre-set message).

The Device Setting page 804 contains programming instructions and allows users to input information to program, system devices. From this page, the user is able to click on links to sub-pages where specific actions may be taken. Those actions include (i) programming alarm sounds and distances/ranges for twin devices 102 and the Controller 101 (if included in the system); turning devices on and off; associating Twin devices 102 with objects, people or pets 103; and setting up emergency notifications in the event of certain losses or other situations.

The Emergency Notifications page 805 lets a user configure notices that may be sent to the user and other third parties. Those notices are sent in certain cases where the Computer Device detects the loss of an object, person or pet wearing, carrying or to which there is affixed, a Twin device 102. Through various drop-down menus, the user is able to specify recipients of notifications; enter contact information for the user and designated recipients; elect to use or customize pre-defined messages; specify which Twin devices will trigger alert notices in the event they are taken or lost; etc. Notification messages will be delivered to recipients by voice and/or text or email messages, subject to the hardware and software capabilities of the user's Computing Device (104 and/or 701). For example, the Security System Software may include voice-to-text messaging (i.e., will cause the Computer Device to type messages based on the user's spoken words); and will provide for text-to-voice messaging (i.e., will cause the Computer Device to verbally play back for 911 and other third parties messages that have been pre-written for the program and/or that are recorded by the user).

The 911 Assistance page 806 contains instructions for using, and governs the operation of, the automated emergency dialing features (FIGS. 6 and 7) of the system 1 where the Controller device 101 is equipped with a Panic Button 201. This page allows users to control various settings and features related to automated dialing services. As illustrated in FIGS. 6 and 7, based on the number of times a user clicks (presses) on the actuator/Panic Button 201), automated calls will be made through the Computer Device (104/701) to 911 requesting police, EMS or fire rescue services. Operationally, the Computer Device (104/701) needs to be in range of the Controller 101 when the Panic Button 201 is pressed. Once the Computer Device (104/701) receives the signal through a wireless communication link 105, the Security System Software 106 causes the Computer Device to immediately dial 911 and play a prerecorded message requesting assistance for the user and explaining that the user cannot physically access the phone. Through this screen page, the user can set various parameters for the 911 dialing features, including (i) activating "silent dialing" and speaker silencing so that an assailant is not alerted to the call; (ii) including personalized information (e.g., medical conditions, allergies, etc.) in messages to 911; sending copies of 911 messages to third parties specified by the user (based on their contact information stored in the Computer Device's memory); adding automated GPS positioning messages to 911 messages; and selecting the type of messages to be sent to third parties (i.e., voice, text or email). To further facilitate the understanding and use of automated 911 dialing and Panic Button 201 functionality, through the drop down menu on the 911 Assistance page 806, a user accesses separate sub-pages with definitions and explanations 807.

Using the functions of and directions on the Find and Seek page 808, users are can cause the Computing Device (104/701) to find objects, people or pets that have been lost. From a drop-down menu, the user can select a Twin device 102 that is attached to an item that has been lost (e.g., an eyeglass case with a Twin device affixed to it that has been misplaced in the home). By clicking on the relevant device name or number on this sub-page, the user can cause the Computer Device (104/701) to send a signal to the lost Twin device. If the lost Twin is within the Computer Device's maximum range (determined by the wireless communication system 105), the Twin's distinct alarm sound will be activated in the Twin and the Computer Device for a pre-set period of time (e.g., 5 minutes).

The Test System screen page 809 allows a user to test the operating status of devices in the system 1 to make sure they are operational, charged (in relation to battery life)), etc. Using a drop-down menu, the user can select each system device (i.e., Controller 101 and Twins 102) to be tested. By following the instructions and clicking on the specified device, alarm sounds will be triggered if it is working. If not working, the user can seek solutions by clicking on a link to a Troubleshooting sub-page.

The Alert Notification screen page 810 provides a user with a visual display notifying that a breach has occurred in the security system 1. This screen flashes on and off at the same time that vibration and/or sound alarms are playing in the Computer Device. The screen also provides pertinent information to the user as to the nature of the breach, which may include (i) the identification of the Controller or Twin device that has been taken (i.e., moved out of the predetermined range or distance) from the Controller or Computer Device; (ii) the object, person or pet associated with the device (if it is a Twin); the time of the breach; and (iv) the parties notified of the breach. The screen also lets the user turn off all alarms.

Figure 9A:
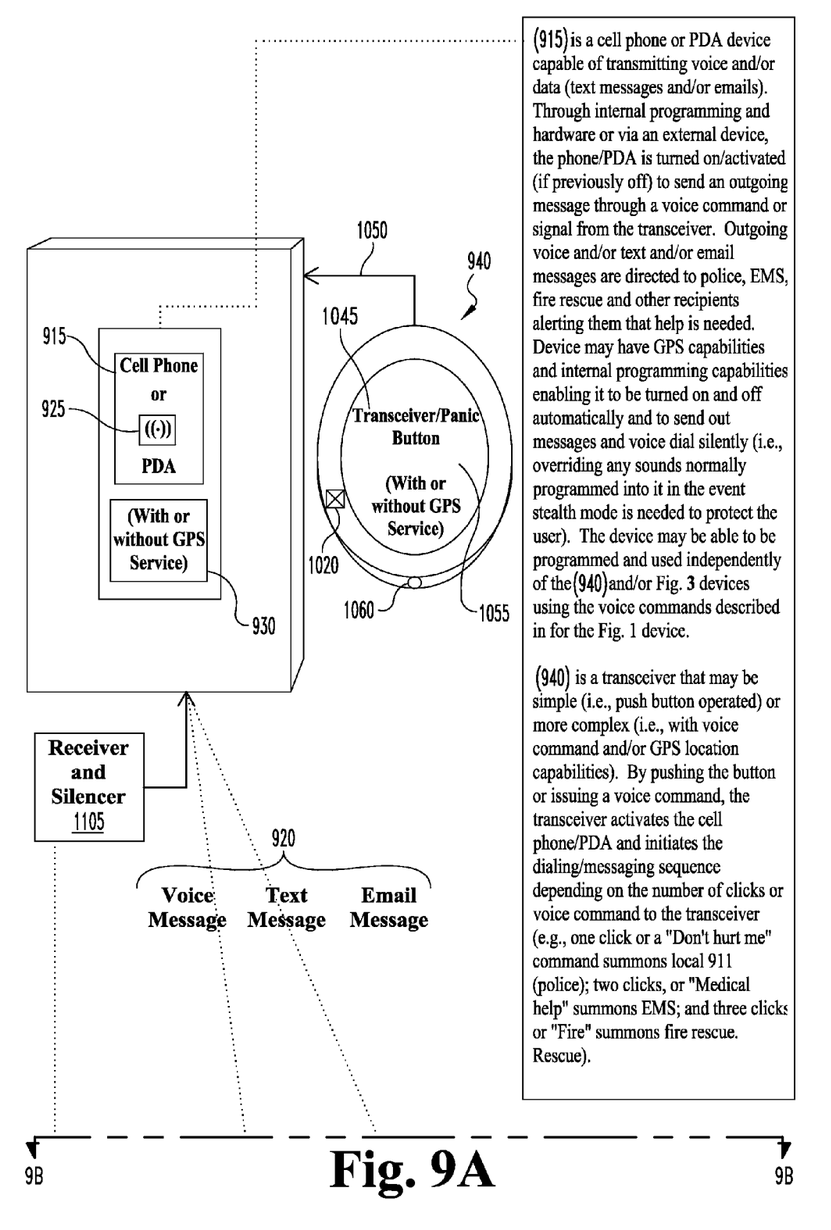
FIG. 9 is a block diagram of another embodiment of the personal security system for automatically initiating remote emergency calls.
Figure 9B:
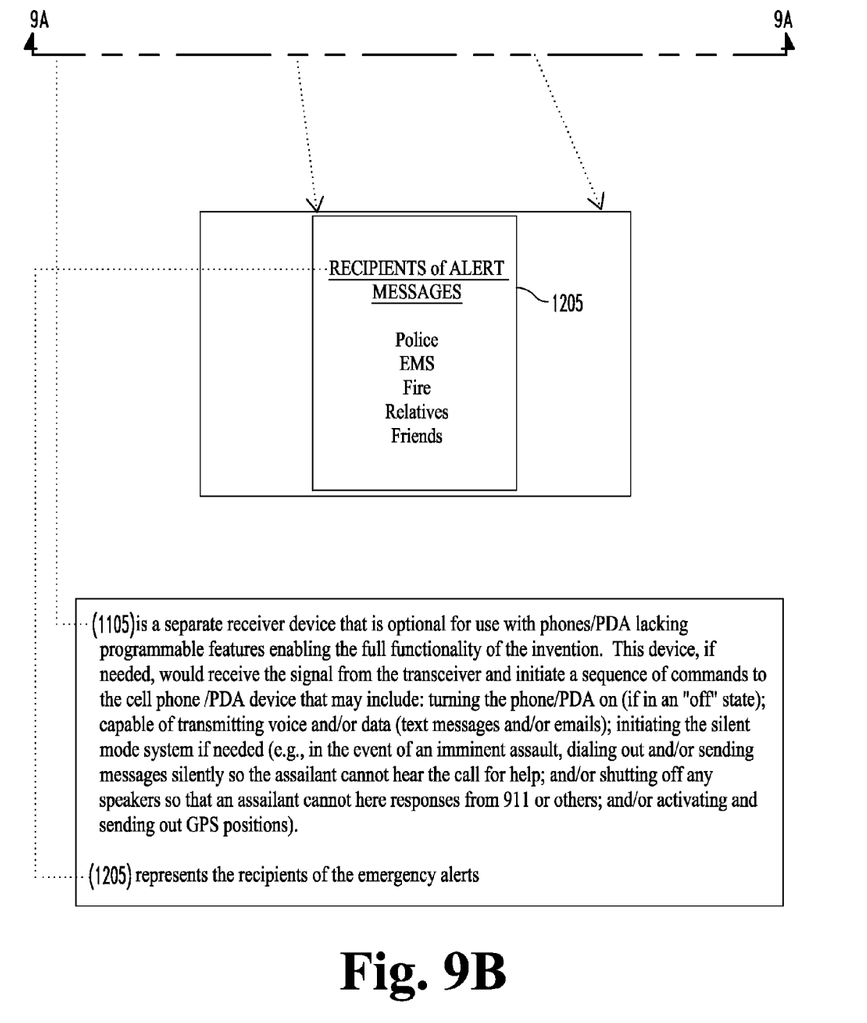

As illustrated in FIGS. 9A and 9B, another implementation of the present novel technology relates to a system 1 for automatically initiating a remote emergency call from a cellular telephone, PDA, portable computer or like communication device 915. The system 1 includes a cellular telephone or other communication device (such as a PDA) 915 which has been preprogrammed with an emergency voice, text, and/or email message or messages 920 and which likewise includes a BLUETOOTH, infrared, or like short-range transceiver 925 for receiving a call and/or message initiation signal. Typically, the cellular telephone or PDA device 915 also includes a GPS location device 930 for assessing its location and providing the same as part of or in addition to the message(s) 920.

The system 1 further includes a remote actuator device 940 for signaling the telephone 915 to initiate the call and/or the PDA or other device to initiate sending a text and/or email message(s) to recipients 1205. Typically, the remote actuator device 940 includes a transceiver 1045 for communicating a simple activation signal 1050 to the telephone 915 and an actuator switch 1055 for actuating the same. The transceiver 1045 is typically connected to a power source 1060, such as a battery, for generating the signal.

In operation, the transceiver 1045, having the form of a fob or like object, is actuated by its trigger switch or button 1055 in an emergency situation. The transceiver 1045 emits an actuation signal 1050, which is received by the cellular telephone or PDA device 915, initiating the telephone or PDA device 915 to transmit its emergency message 1020. Typically, the message 1020 is a 911 call or the like (which may include a voice message and/or a text or email message), but may also be individualized in both content and destination (e.g., a message may be sent to EMS or the police based on local 911 services; but may also be sent to a spouse, parent, etc . . . ). The message 1020 typically includes GPS location information. The message may also be different based on different "clicks" of the transceiver: e.g., 1 click may be programmed to send a message such as "Help: I'm being assaulted; cannot speak; and need assistance immediately at the following address;" while 2 clicks may be programmed to send a message such as "I'm in a medical crisis; cannot speak on the phone; and need emergency medical services immediately at the following address; and 3 clicks may be programmed to send a message such as "there is a fire; send fire rescue." Initiation of the message 1020 may likewise cue the telephone for remote querying of its location by responders and/or remote audio and/or video monitoring of the situation. The transceiver device may be either physically activated by clicking or pressing a trigger switch or button; and/or may be voice activated. For a voice activation model, the device would require a microphone capable of detecting voice commands and sending a signal to the phone or PDA device activating a call and or delivery of a text and/or email message to recipients 1205, including, for example, the police or EMS (and other recipients as well).

For alerts involving threat to life or limb, the system would need to be silently activated so as not to alert or antagonize an assailant. The system would also need to shut off voice response from a call recipient for example using the receiver & silencer 1105. In other words, once an emergency message is sent to the police, the phone or PDA would need to cut off incoming conversation so as to avoid an assailant overhearing a conversation from the responder. The override system would not be needed for a summons to EMS not involving physical assault.

While the novel technology has been illustrated and described in detail in the drawings and foregoing description, the same is to be considered as illustrative and not restrictive in character. It is understood that the implementations have been shown and described in the foregoing specification in satisfaction of the best mode and enablement requirements. It is understood that one of ordinary skill in the art could readily make a nigh-infinite number of insubstantial changes and modifications to the above-described implementations and that it would be impractical to attempt to describe all such implementation variations in the present specification.

Accordingly, it is understood that all changes and modifications that come within the spirit of the novel technology are desired to be protected.

While a particular implementation of the present invention has been shown and described, modifications may be made. It is therefore intended in the appended claims to cover such changes and modifications which follow in the true spirit and scope of the invention.

What is claimed is:

1. A personal security system for automatically warning a user when an item is lost or after being so lost is then found, comprising:
    a first transceiver;
    at least one second transceiver in communication with the first transceiver;
    a communication link connecting the first transceiver and the at least one second transceiver and having a predetermined operating distance;
    a first memory operationally connected to the first transceiver and capable of storing a first predetermined signal;
    a first microprocessor operationally connected to the first memory;
    a first user interface including a display screen operationally connected to the first transceiver;
    a first data processor operationally connected to the first transceiver;
    a first vibration device operationally connected to the first transceiver;
    a first sound device operationally connected to the first transceiver;
    at least one second memory operationally connected to the at least one second transceiver and capable of storing at least one second predetermined signal;
    at least one second microprocessor operationally connected to the at least one second memory;
    at least one second user interface including a display screen operationally connected to the at least one second transceiver;
    at least one second data processor operationally connected to the at least one second transceiver;
    at least one second vibration device operationally connected to the at least one second transceiver;
    at least one second sound device operationally connected to the at least one second transceiver;
    wherein when the first transceiver and the at least one second transceiver are separated by a separation distance exceeding the predetermined operating distance for a predetermined duration, the first transceiver generates the first predetermined signal for the predetermined duration, and the at least one second transceiver generates the at least one second predetermined signal for the predetermined duration; and
    wherein, after being so separated, when the first transceiver and the at least one second transceiver are brought back within the predetermined operating distance, the first transceiver again generates the first predetermined signal for the predetermined duration, and the at least one second transceiver again generates the at least one second predetermined signal for the predetermined duration.

2. The personal security system of claim 1 wherein the first transceiver and the at least one second transceiver are independently programmable with optional settings.

3. The personal security system of claim 2 wherein the first transceiver is configured to program optional settings for the first transceiver and the at least second transceiver.

4. The personal security system of claim 1, further comprising:
    a hand-held computer device capable of functions selected from the group consisting of telephonic, messaging, email, and combinations thereof;
    a memory operationally connected to the hand-held computer device and capable of storing a third predetermined signal;
    a microprocessor operationally connected to the memory of the hand-held computer device;
    a user interface including a display screen operationally connected to the hand-held computer device;
    a data processor operationally connected to the hand-held computer device;
    a vibration device operationally connected to the hand-held computer device;
    a sound device operationally connected to the hand-held computer device;
    a communication link connecting the hand-held computer device with the first transceiver and having a predetermined operating distance;
    wherein the hand-held computer device is configured to recognize digital signals, make pre-set responses to digital signals, and respond to digital signals to program optional settings and respond in a pre-set way;
    wherein the hand-held computer is capable of displaying information in response to digital signals;
    wherein the memory of the hand-held computer device is capable of storing a database containing at least one contact information;
    wherein the memory of the hand-held computer device is capable of storing optional settings;
    wherein the memory of the hand-held computer device is capable of storing at least one message;
    wherein the hand-held computer device is configured to automatically send the at least one message to recipients selected by the user of the hand-held computer device in response to digital signals selected from the group consisting of the first transceiver, the at least one second transceiver, and combinations thereof;
    wherein upon separation of the at least one second transceiver and the hand-held computer device by a distance exceeding the predetermined operating distance from the first transceiver for the predetermined duration, the first transceiver generates the first predetermined signal for a predetermined duration, the at least one second transceiver generates the at least one second predetermined signal for the predetermined duration, and the hand-held computer device generates the third predetermined signal for the predetermined duration;
    wherein, after being so separated, when a device selected from the group consisting of the first transceiver, the at least one second transceiver, and the hand-held computer device is brought back within the predetermined operating distance, the first transceiver again generates the first predetermined signal for the predetermined duration, the at least one second transceiver again generates the at least one second predetermined signal for the predetermined duration, and the hand-held computer device again generates the third predetermined signal for the predetermined duration; and
    wherein the hand-held computer is capable of automatically delivering the at least one message upon separation from a member selected from the group consisting of the first transceiver, the at least one second transceiver, and combinations thereof.

5. The personal security system of claim 4 wherein the hand-held computer device is the first transceiver.

6. The personal security system of claim 4, further comprising:
- an actuator device operationally connected to the first transceiver;
- wherein the hand-held computer device is configured to store emergency messages to send to one or more emergency operators;
- wherein depressing the actuator a preset number of times triggers the hand-held computer device to send the emergency messages;
- wherein the hand-held computer device is configured to initiate an automated 911 dialing sequence upon receiving digital signals from the first transceiver as a result of a user depressing the actuator device; and
- wherein the hand-held computer device is configured to establish telephonic dialing, redialing, and disconnection;
- wherein the hand-held computer device is configured to make an automatic connection to 911 services upon receiving a signal from the first transceiver after the user depresses the actuator device;
- wherein the hand-held computer device is configured to deliver a preset message to 911 operators after the automatic connection to 911 services upon receiving a signal from the first transceiver after the user depresses the actuator device;
- wherein the preset message delivered to the 911 operators is configured to contain specific user information;
- wherein the hand-held computer device is configured to display information upon receiving signals upon receiving a signal from the first transceiver after the user depresses the actuator device;
- wherein the hand-held computer device is configured to control telephonic features of the hand-held computer device based upon the number of times the actuator device is pressed;
- wherein the hand-held computer device is configured to emit an alarm sound based upon depressing the actuator device in a preset manner;
- wherein the hand-held computer device is configured to cancel based upon the number of times the actuator device depressed; and
- wherein the preset message delivered to 911 operators global positioning system (GPS) coordinates.

7. The personal security system of claim 6, further comprising:
- a computer based in a fixed location;
- wherein the computer has telephone, messaging, and email capabilities;
- a communication link having a predetermined operating distance capable of connecting the computer with first transceiver, the at least one second transceiver, and the hand-held computer device;
- a memory operationally connected to the computer capable of storing predetermined signals;
- a microprocessor operationally connected to the memory operationally connected to the computer;
- a user interface including a display screen operationally connected to the computer;
- a data processor operationally connected to the computer;
- a sound device operationally connected to the computer; and
- wherein the computer and the hand-held computer device automatically negotiate priority to dial 911 and send an emergency message when the user depresses the actuator;
- wherein the computer and the hand-held computer device are configured to perform the same functions, but the hand-held computer device gains priority when the first transceiver is taken outside of the fixed location; and
- wherein the computer and the hand-held computer device are configured to perform the same functions, but the hand-held computer device gains priority when the at least one second transceiver is taken outside of the fixed location.

8. The personal security system of claim 7 wherein the first transceiver, the at least one second transceiver, the hand-held computer device, and the computer contain a complementary radio communication circuit for transmitting and receiving digital signals and communicating information.

9. The personal security system of claim 8 wherein the complementary radio communication circuit comprises BLUETOOTH transceivers.

10. The personal security system of claim 9, further comprising:
- a menu system navigable by the user.

* * * * *